United States Patent [19]
Fujimoto et al.

[11] Patent Number: 6,058,777
[45] Date of Patent: May 9, 2000

[54] VIBRATING GYROSCOPE INCLUDING A PAIR OF PIEZOELECTRIC BODIES WITH ELECTRICALLY FLOATING INTERFACE

[75] Inventors: Katsumi Fujimoto, Toyama-ken; Kazuhiro Ebara; Nobuyuki Ishitoko, both of Toyama, all of Japan

[73] Assignee: Murata Manufacturing Co., Ltd., Japan

[21] Appl. No.: 09/026,388

[22] Filed: Feb. 19, 1998

[30] Foreign Application Priority Data

Feb. 20, 1997 [JP] Japan .................................. 9-053994

[51] Int. Cl.[7] .............................. G01P 9/00; H01L 41/08
[52] U.S. Cl. ..................................... 73/504.12; 73/504.14; 310/316
[58] Field of Search ............................... 396/53; 310/317, 310/316, 323, 348, 351, 366; 73/504.12, 504.14, 504.15

[56] References Cited

U.S. PATENT DOCUMENTS

| | | | |
|---|---|---|---|
| 5,430,342 | 7/1995 | Watson | 310/316 |
| 5,635,786 | 6/1997 | Fujimoto et al. | 73/504.12 |
| 5,765,046 | 6/1998 | Watanabe | 73/504.14 |
| 5,794,080 | 8/1998 | Watanabe | 73/504.12 |

FOREIGN PATENT DOCUMENTS

| | | |
|---|---|---|
| 7332988 | 12/1995 | Japan . |
| 9014968 | 1/1997 | Japan . |

*Primary Examiner*—Helen C. Kwok
*Attorney, Agent, or Firm*—Ostrolenk, Faber, Gerb & Soffen, LLP

[57] ABSTRACT

A vibrating gyroscope includes a vibrating unit and a driving unit for driving the vibrating unit. The vibrating unit includes at least a pair of piezoelectric bodies stacked and polarized in a stacked direction thereof such that polarizing directions of the piezoelectric bodies are opposed to each other. An interface between the piezoelectric bodies is electrically floating with respect to a reference potential. The driving circuit receives at least one feedback signal from the vibrating unit and outputs to the vibrating unit a driving signal which has substantially the same phase as the feedback signal.

11 Claims, 4 Drawing Sheets

VIBRATING GYROSCOPE INCLUDING A PAIR OF PIEZOELECTRIC BODIES WITH ELECTRICALLY FLOATING INTERFACE

BACKGROUND OF THE INVENTION

1. Field of the Invention

The present invention relates to a vibrating gyroscope, and more particularly to a vibrating gyroscope used for an anti-shaking device for a camera, a car navigation system, a pointing device, or the like.

2. Description of the Related Art

In FIGS. 4 and 5 are shown an example of a conventional vibrating gyroscope. A vibrating gyroscope 1 includes a rectangular-parallelepiped vibrating unit 2. The vibrating unit 2 has two adjacent plate-shaped piezoelectric bodies 3 and 4. The piezoelectric bodies 3 and 4 are polarized in opposite directions. The vibrating unit 2 further has an intermediate electrode 5 formed between the piezoelectric bodies 3 and 4. On the piezoelectric body 3 is formed an electrode 6, and on the piezoelectric body 4 is formed an electrode 7. The electrode 6 on the piezoelectric body 3 is separated into six electrode portions 6a to 6f by grooves. The intermediate electrode 5 is provided with supporting members 8 around nodes of the bending vibration of the vibrating unit 2. The supporting members 8 are used to support the vibrating unit 2, and are connected to a reference potential.

The sum of output signals from the electrode portions 6c and 6d, in the center of the longitudinal direction of the piezoelectric body 3, is input to an amplification circuit 9 as a feedback signal. The output signal from the amplification circuit 9 is adjusted by a gain control amplifier 10 so that the amplitude of the output signal is constant and input to a phase correction circuit 11. The phase of the output signal is corrected by a phase correction circuit 11 and the output signal from the phase correction circuit 11 is supplied to the electrode 7 as a driving signal. Thus, the amplification circuit 9, the gain control amplifier 10 and the phase correction circuit 11 constitute a driving circuit 16 which receives the feedback signal and output the driving signal.

On the other hand, the difference between the output signals from the electrode portions 6c and 6d is output from a differential circuit 12. The output signal of the differential circuit 12 is detected in synchronization with a signal from the phase correction circuit 11 in a synchronous detection circuit 13. The output signal from the synchronous detection circuit 13 is smoothed by a smoothing circuit 14, and is further amplified by a DC amplification circuit 15.

In the vibrating gyroscope 1, the intermediate electrode 5 is connected to the reference potential and the driving signal from the phase correction circuit 11 is applied to the electrode 7. This causes the piezoelectric body 4 to vibrate. Since the piezoelectric body 4 is bonded to the piezoelectric body 3, the whole vibrating unit 2 vibrates under the bending mode in a direction perpendicular to the surfaces with the electrodes 6 and 7. This bending vibration of the vibrating unit 2 also bends the piezoelectric body 3, and the signals corresponding to the bending are output from the electrode portions 6c and 6d. The sum of the output signals is input to the amplification circuit 9.

During the above-explained operation, an electric signal as the driving signal is first converted to a mechanical vibration at the piezoelectric body 4. The mechanical vibration at the piezoelectric body 4 is then transmitted to the piezoelectric body 3 and causes the mechanical vibration at the piezoelectric body 3. Finally, the mechanical vibration at the piezoelectric body 3 is converted to another electric signal as the output signal used for the feedback signal. Due to these conversions, there arises a phase difference between the driving signal input to the vibrating unit 2 and the output signal from the vibrating unit 2. This means that the oscillation frequency under the bending mode of the vibrating unit 2 is shifted with respect to the resonance frequency under the bending mode of the vibrating unit 2.

In order for the vibrating unit 2 to be self-excited and for the vibrating unit 2 and the driving circuit 16 to constitute an oscillation circuit which oscillates constantly, it is necessary that the driving signal which will be generated based on the output signal from the vibrating unit 2 and input to the vibrating unit 2 next time has the original phase which was previously input to the vibrating unit 2. Otherwise, the driving signal input to the vibrating unit 2 each time would have a different phase, and the oscillation circuit having the vibrating unit 2 and the driving circuit 16 cannot reach a constant state so that the vibrating unit 2 can be self-excited.

Normally, vibration gain becomes maximum with a phase differences of 90 degrees and the vibrating unit 2 is so designed that the output signal from the vibrating unit 2 and the driving signal input to the vibrating unit 2 has the phase difference of 90 degrees. Accordingly, the phase correction circuit 11 is used to correct the phase difference of 90 degrees between the driving signal and the feedback signal.

While not rotating, the vibrating unit 2 vibrates under the bending mode perpendicularly to the surfaces with the electrodes 6 and 7 formed thereon, which causes the output signals from the electrode portions 6c and 6d to be similar, and a signal is not output from the differential circuit 12. When the vibrating unit 2 rotates on its axis, a Coriolis force changes the vibrating direction of the vibrating unit 2. This generates a difference between the detection signals from the electrode portions 6c and 6d, and the signal difference is output from the differential circuit 12. The output signal of the differential circuit 12 is detected by the synchronous circuit 13 and is smoothed by the smoothing circuit 14, before it is amplified by the dc amplification circuit 15, whereby a DC signal corresponding to rotational angular velocity can be obtained.

In the aforementioned conventional vibrating gyroscope, the intermediate electrode 5 of the vibrating unit 2 needs to be connected to the reference potential This causes a complicated interconnection for the intermediate electrode 5. In addition, capacitors, resistors and so forth, must be used to form the phase correction circuit 11. Therefore, there arises a problem that the sensitivity and temperature characteristics of the vibrating gyroscope 1 change depending on the deviation of the capacitance, resistance or the like of the capacitors and resistors used in the vibrating gyroscope 1.

Moreover, the deviation of the capacitance, resistance or the like of the capacitors and resistors causes the change or fluctuation of the phase of the detection signals, which further causes the detection timing by the synchronous detection circuit 13 to shift easily. This results in drift of the output signal from the DC amplification circuit 15 and deterioration of the temperature characteristics.

In the case where the vibrating unit is operated at a low frequency of 500 kHz or less, a capacitor used in the phase correction circuit 11 must have a large capacitance, which makes it impossible to include the phase correction circuit 11 in an integrated circuit. Consequently, the number of circuit components used increases, thereby causing a cost increase and preventing the vibrating gyroscope from being made small.

Accordingly, there arises a demand for a vibrating gyroscope which can solve the aforementioned drawbacks associated with the conventional vibrating gyroscope.

SUMMARY OF THE INVENTION

The present invention is directed to a vibrating gyroscope that satisfies the demand. The vibrating gyroscope comprises a vibrating unit and a driving unit for the vibrating unit. The vibrating unit includes at least a pair of piezoelectric bodies stacked and polarized in a stacked direction thereof such that polarizing directions of the piezoelectric bodies are opposed with each other. An interface between the piezoelectric bodies is electrically floating with respect to a reference potential. The driving receives at least one feedback signal from the vibrating unit and outputs to the vibrating unit a driving signal which has substantially the same phase as the feedback signal.

In one embodiment, the vibrating unit further includes first and second electrodes on an upper surface and a bottom surface of the stacked piezoelectric bodies, respectively, and the feedback signal is output from the first electrode and the driving signal is input to the second electrode. The vibrating unit further includes an intermediate electrode at the interface between the piezoelectric bodies.

The first electrode preferably have two divided electrode portions, and the driving circuit receives two of the feedback signals. Further, the vibrating gyroscope preferably comprises a detection circuit for detecting the difference between two signals based on the two of the feedback signals.

The vibrating unit may further include a supporting member connected to the second electrode, the supporting member is located at a point corresponding to a node of the vibrating unit. The supporting member may be made of a conductive material and the driving signal is applied to the supporting member.

According to the present invention, it is not necessary to connect a vibrating body to a reference potential, which enables simplified interconnection compared with conventional interconnection. Also, it is not necessary to from a phase correction circuit in a driving circuit, which enables circuit size reduction. In addition, changes in resistances and capacitances in the phase correction circuit are eliminated, which can suppress a signal phase shift, and the vibration point for activating the bending vibration of the vibrating unit is not changed, so that changes in sensitivity and temperature characteristics can be reduced. Moreover, the synchronization-detection timing shift due to signal phase changes can be suppressed, and deterioration in drift, and sensitivity and temperature characteristics can be suppressed.

For the purpose of illustrating the invention, there is shown in the drawings several forms which are presently preferred, it being understood, however, that the invention is not limited to the precise arrangements and instrumentalities shown.

DETAILED DESCRIPTION OF A PREFERRED EMBODIMENT

Hereinafter, the preferred embodiment of the present invention is explained in detail with reference to the drawings.

Figure 1:
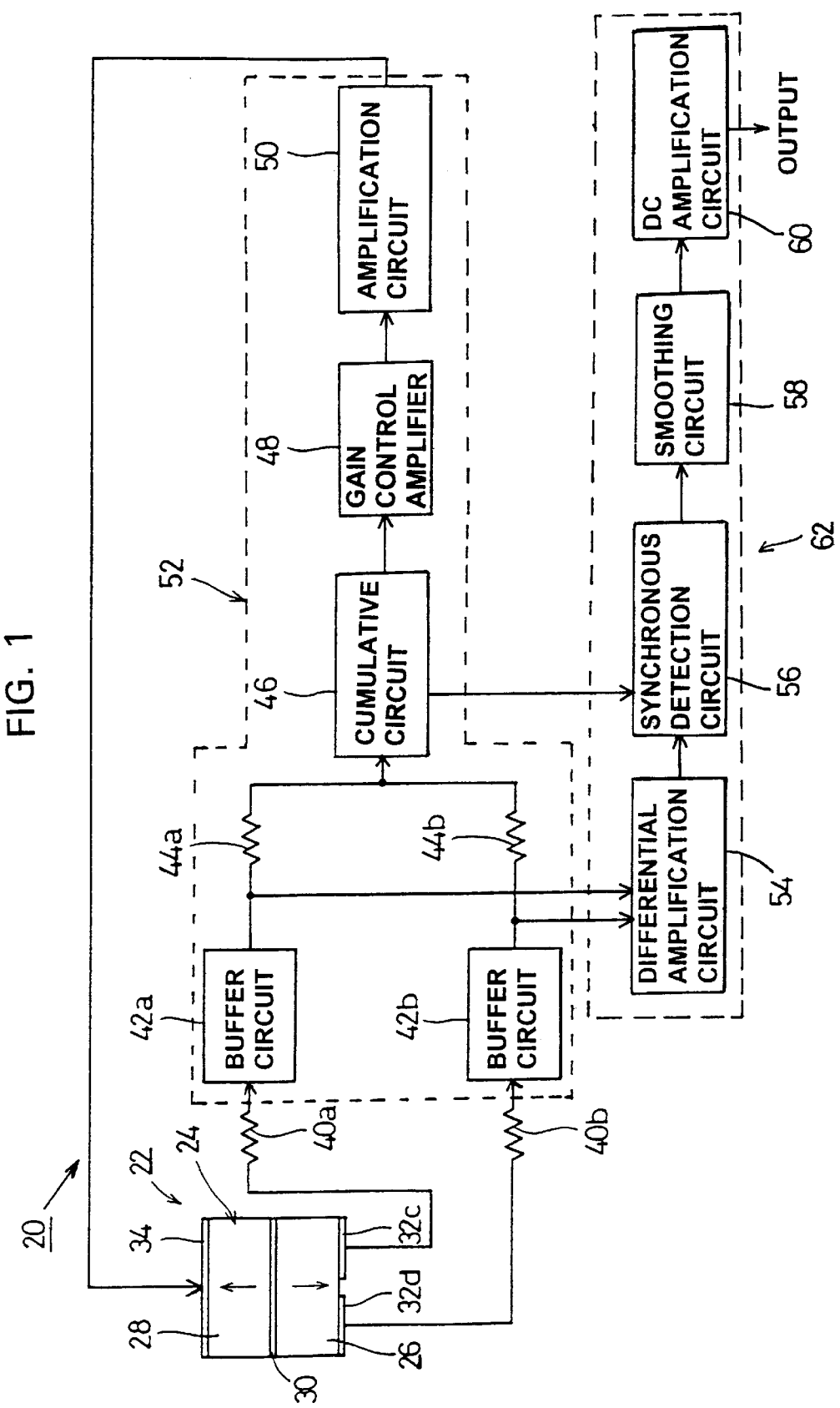
FIG. 1 is a block diagram showing one embodiment of a vibrating gyroscope of the present invention.
Figure 2:
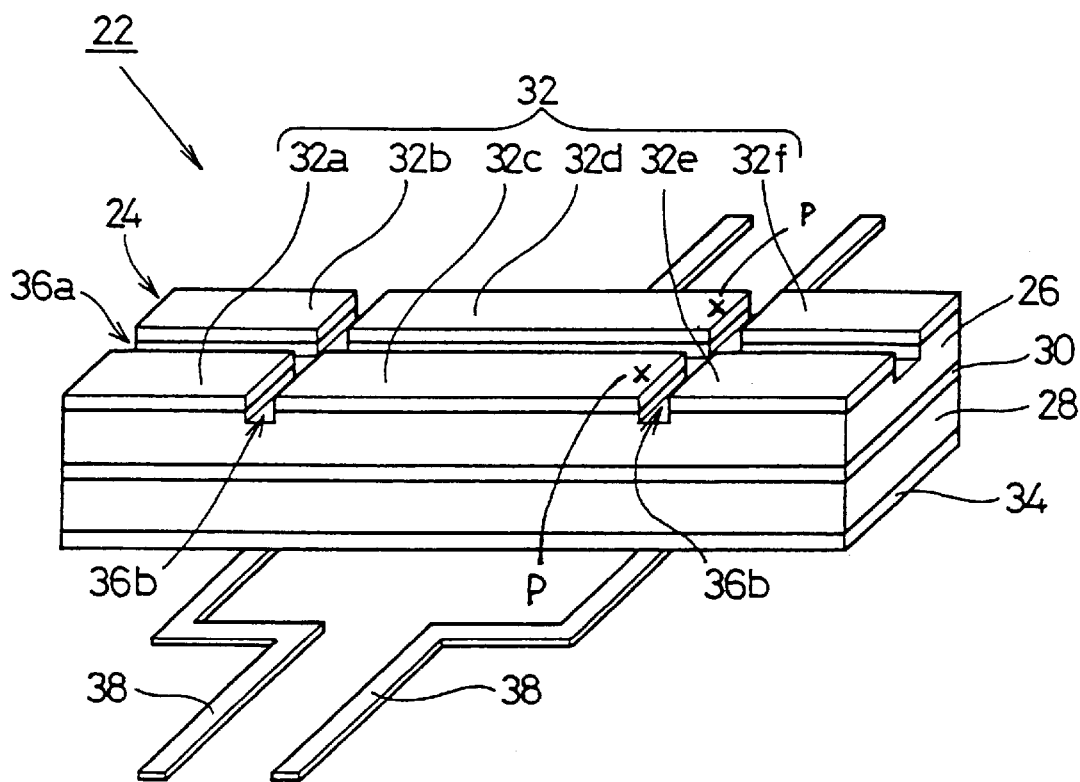
FIG. 2 is a perspective view of a vibrating unit used in the vibrating gyroscope shown in FIG. 1.
Figure 3:
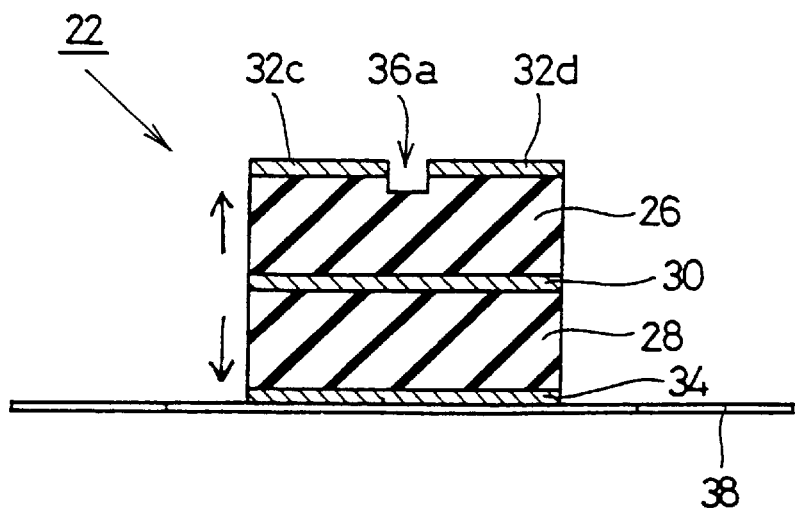
FIG. 3 is a section view of the vibrating unit shown in FIG. 2.
Figure 4:
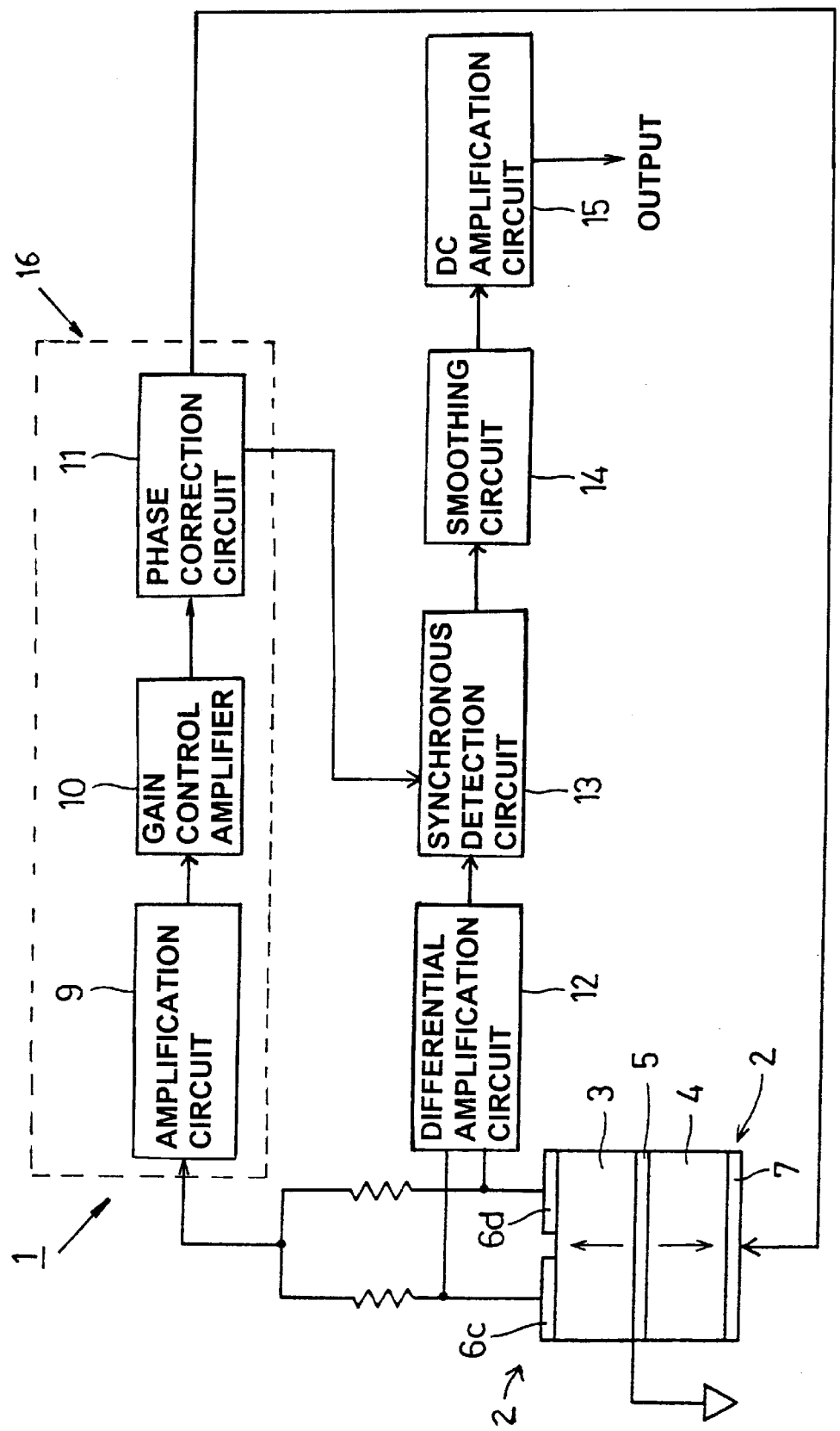
FIG. 4 is a block diagram showing one example of a conventional vibrating gyroscope.
Figure 5:
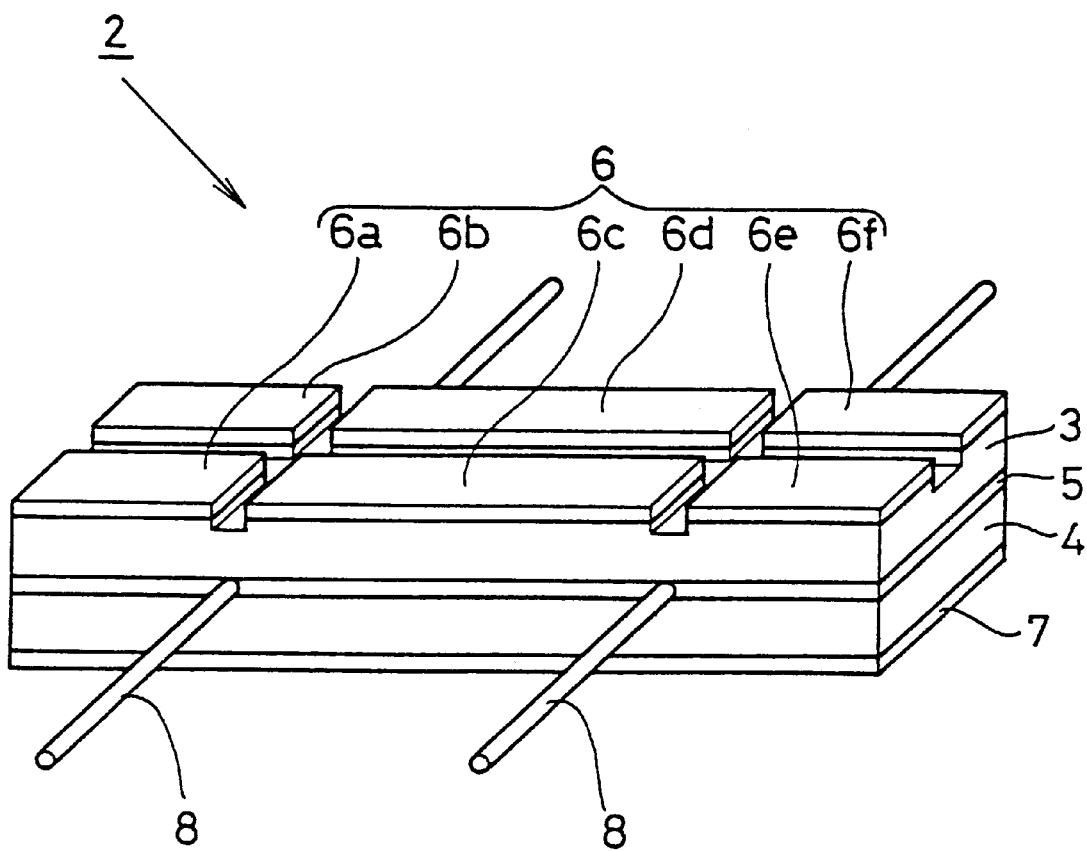
FIG. 5 is a perspective view of a vibrator used in the conventional vibrating gyroscope shown in FIG. 4.

FIGS. 1, 2 and 3 show a vibrating gyroscope 20 according to an embodiment of the present invention. As shown in FIG. 1, a vibrating gyroscope 20 includes a vibrating unit 22. The vibrating unit 22 includes a rectangular parallelepiped-shaped vibrating body 24. As is best shown in FIG. 2, the vibrating body 24 has two stacked piezoelectric bodies 26 and 28. Between the piezoelectric bodies 26 and 28 is formed an intermediate electrode 30. On the piezoelectric bodies 26 and 28 are formed electrodes 32 and 34 so that the piezoelectric bodies 26 and 28 are interposed between the electrode 32 and the intermediate electrode 30 and between the electrode 34 and the intermediate electrode 30, respectively. The electrode 32 on the piezoelectric body 26 is separated into six electrode portions 32a, 32b, 32c, 32d, 32e and 32f by grooves 36a and 36b. The groove 36a is formed in the center of the width direction of the vibrating body 24 so as to extend in the longitudinal direction of the vibrating body 22 and separate the electrode portions 32a, 32c and 32e from the electrode portions 32b, 32d and 32f. The two grooves 36b are formed at points corresponding to two nodes of the bending vibration of the vibrating body 24 so as to extend in the width direction of the vibrating body 24 and separate the electrode portions 32c and 32d from the electrode portions 32a and 32b and the electrode portions 32e and 32f.

The electrode 34 is provided with two supporting members 38 at the points corresponding to the two nodes of the vibrating body 24, respectively. These supporting members 38 are composed of conductive material such as metal. The supporting members 38 support the vibrating body 22, and are used to input or output a signal to the electrode 34. Wiring for connection to a drive circuit 52 and a detection circuit 62 (FIG. 1) is connected to the electrode portions 32c and 32d at portions close to the nodes of the vibrating body 24, for example, at points P.

The piezoelectric bodies 26 and 28 are polarized in the stacked direction such that the polarizing directions of the piezoelectric bodies 26 and 28 are opposed as indicated by arrows in FIGS. 1 and 3. That is, the piezoelectric bodies 26 and 28 are polarized from the inside of vibrating body 24 toward electrodes 32 and 34, respectively. Alternatively, the piezoelectric bodies 26 and 28 may be polarized form the electrodes 32 and 34 toward the inside of vibrating body 24, respectively. In order to polarize the piezoelectric bodies 26 and 28, electric fields are applied between the intermediate electrode 30 and the electrodes 32 and 34. In the case where the piezoelectric bodies 26 and 28, which have been polarized previously, are bonded, the intermediate electrode 30 does not need to be formed. This is because the intermediate electrode 30 is not connected to a reference potential and is electrically floating with respect to the reference potential. In the case where no intermediate electrode is provided between the piezoelectric bodies 26 and 28, it can be said that the interface between the piezoelectric bodies 26 and 28 is electrically floating with respect to the reference potential. Since the piezoelectric bodies 26 and 28 polarized in opposite directions have the above-described layered structure, the vibrating unit 22 has a bimorph structure.

As is best shown in FIG. 1, the two electrode portions 32c and 32d are respectively connected to buffer circuits 42a and 42b via resistors 40a and 40b. The buffer circuits 42a and 42b are connected to a cumulative circuit 46 via resistors 44a and 44b. The output end of the cumulative circuit 46 is connected to a gain control amplifier 48, and the gain control amplifier 48 is connected to an amplification circuit 50. The output signal of the amplification circuit 50 is supplied as a driving signal to the electrode 34 via the supporting members 38. The buffer circuits 42a, 42b, the cumulative circuit 46, the gain control amplifier 48 and the amplification circuit 50 constitute a driving circuit 52. It is important for the present invention that the driving circuit 52 has no phase correction circuit and, therefore, outputs a driving signal having the same phase as the feedback signal which the driving circuit 52 receives.

The output signals of the buffer circuits 42a and 42b are input to a differential amplification circuit 54. The output signal of the differential amplification circuit 54 is detected by a synchronous detection circuit 56 in synchronization with a signal from the cumulative circuit 46. The output signal of the synchronous detection circuit 56 is smoothed by a smoothing circuit 58, and is amplified by a DC amplification circuit 60. The differential amplification circuit 54, the synchronous detection circuit 56, the smoothing circuit 58 and the DC amplification circuit 60 constitute a detection circuit 62.

In the vibrating gyroscope 20, the output signals from the electrode portions 32c and 32d are input to the driving circuit 52 as feedback signals. More specifically, the output signals from the electrode portions 32c and 32d are input to the cumulative circuit 46 via the buffer circuits 42a and 42b which are employed for impedance matching, and the sum of the output signals is output from the cumulative circuit 46. The output signal of the cumulative circuit 46 is adjusted by the gain control amplifier 48 so that its amplitude is constant. The output signal of the gain control amplifier 48 is amplified by an amplification circuit 50 before it is supplied as a driving signal to the electrode 34. Thus, the driving circuit 52 receives the feedback signals from the electrode portions 32c and 32d and outputs the driving signal to the electrodes 34.

The supply of the driving signal to the electrode 32 without connecting the intermediate electrode 30 to a reference potential applies an AC voltage to the two piezoelectric bodies 26 and 28 between the electrode portions 32c and 32d and the electrode 34. Since the piezoelectric bodies 26 and 28 are polarized in opposite directions, the driving signal causes them to vibrate in the opposite directions. That is, when the piezoelectric body 26 expands, the piezoelectric body 28 contracts. Conversely, when the piezoelectric body 26 contracts, the piezoelectric body 28 expands. Accordingly, the vibrating body 24 vibrates under the bending mode in a direction perpendicular to the surfaces with the electrodes 32 and 34 formed thereon, or in the stacking direction of the piezoelectric bodies 26 and 28.

At this time, the output signals of the electrode portions 32c and 32d are identical, and no signal is output from the differential amplification circuit 54. Accordingly, this indicates that no rotational angular velocity acts on the vibrating gyroscope 20. When the vibrating body 24 rotates on its axis, a Coriolis force changes the direction of the bending vibration of the vibrating body 24. This generates a difference between the bending conditions in the vicinity of the electrode portions 32c and 32d, and the detection signals output from the electrode portions 32c and 32d have a difference in accordance with this difference. Accordingly, a signal, corresponding to the difference between the output signals of the electrode portions 32c and 32d, is output from the differential amplification circuit 54.

The output signal of the differential amplification circuit 54 is detected by the synchronous detection circuit 56 in synchronization with a signal from the cumulative circuit 46, thereby detecting a signal in which only the positive portions of the output signal from the differential amplification circuit 54, only the negative portions thereof, or either polarity thereof is inverted. The output signal of the synchronous detection circuit 56 is smoothed by the smoothing circuit 58, and is amplified by the DC amplification circuit 60. The magnitude of the Coriolis force acting on the vibrating body 24 corresponds to rotational angular velocity, and a change of the bending vibration of the vibrating body 24 corresponds to the magnitude of the Coriolis force. Accordingly, a change in the output signals from the electrode portions 32c and 32d corresponds also to the magnitude of the Coriolis force. Therefore, from the magnitude of the output signal of the dc amplification circuit 60, it is possible to know the magnitude of the rotational angular velocity acting on the vibrating gyroscope 20.

In addition, when the direction of the acting rotational angular velocity reverses, the direction of the Coriolis force also reverses, which reverses a change in the vibrating direction of the vibrating body 24. Thus, the polarity of the signal detected by the synchronous detection circuit 56 is reversed, and the polarity of a signal finally outputted from the dc amplification circuit 60 is reversed. Accordingly, it is possible to know the direction of the rotational angular velocity from the polarity of the output signal of the DC amplification circuit 60.

In the vibrating gyroscope 20, the interface between the piezoelectric bodies 26 and 28 is made electrically floating with respect to a reference potential and an AC voltage is applied across the electrode portions 32c and 32d and the electrode 34 so that the driving signal from the driving circuit 52 is supplied to both of the piezoelectric bodies 26 and 28, i.e., to the entire of the vibrating body 24. Therefore, the output signal used as the feedback signal for the driving circuit 52 is obtained without converting between an electric signal to mechanical vibration. As a result, there arises substantially no phase change between the driving signal input to the vibrating unit 2 and the output signal from the vibrating unit 2. That is, the phase difference between the driving signal and the feedback signal is approximately zero, and the vibrating unit 22 can be oscillated at the resonant frequency under the bending vibration of the vibrating unit 22 when it does not rotate.

Also, the substantially no phase change eliminates the need for inserting a phase correction circuit in the driving circuit 52, which simplifies the circuit arrangement and enables a small circuit size to be realized by using integrated circuits. Therefore, the vibrating unit 22 can be self-excited by using the driving circuit 52, which includes no phase correction circuit.

In addition, capacitors, resistors or the like which were conventionally employed in the phase correction circuit are not needed, the vibrating gyroscope of the invention has less deviation in oscillation frequency or the phase thereof. This results in a vibrating gyroscope having small deviation in sensitivity and temperature dependency characteristics. Further, no signal phase changes prevent a shift in the synchronization detection timing by the synchronization detection circuit 56, which prevents drift, and sensitivity and temperature characteristics from deteriorating.

Also, because there is no need for connecting the vibrating unit 22 to the reference potential the interconnection wiring is simplified. In the vibrating unit 22, the supporting members 38 may be used to input the driving signal, so that it can be used for the dual purpose of supporting the vibrating unit 22 and signal input. In addition, the supporting members 38 do not need to penetrate the intermediate electrode as do the conventional supporting members, which facilitates the production of the vibrating unit 22.

According to the above-described vibrating gyroscope 20, the signal from two output portions are used as the feedback signal, however, the signal from one output portion may be fed back instead. In other words, with the output signal from the electrode 34 as the feedback signal, its amplitude may be controlled to form the driving signal. This case eliminates the need for the cumulative circuit, the impedance of the output signal from the electrode 34 being converted by the buffer circuit before the amplitude thereof is adjusted by the gain control amplifier and the amplification circuit. The thus obtained driving signal is supplied to the electrodes 32c and 32d. Also, in this manner, the bending vibration of the vibrating unit 24 can be activated to provide the above-described advantages.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:
   a vibrating unit including at least a pair of piezoelectric bodies, the piezoelectric bodies being stacked and polarized in a stacked direction thereof such that polarizing directions of the piezoelectric bodies are opposed to each other, an interface between the piezoelectric bodies being electrically floating with respect to a reference potential; and
   a driving circuit for driving the vibrating unit, the driving circuit receiving at least one feedback signal from the vibrating unit and outputting to the vibrating unit a driving signal which has substantially the same phase as the feedback signal.

2. A vibrating gyroscope according to claim 1, wherein the vibrating unit further includes first and second electrodes on an upper surface and a bottom surface of the stacked piezoelectric bodies, respectively, and the feedback signal is output from the first electrode and the driving signal is input to the second electrode.

3. A vibrating gyroscope according to claim 2, wherein the vibrating unit further includes an intermediate electrode at the interface between the piezoelectric bodies.

4. A vibrating gyroscope according to claim 2, wherein the first electrode has two divided electrode portions, and the driving circuit receives two feedback signals, one from each of the divided electrode portions.

5. A vibrating gyroscope according to claim 4, further comprising a detection circuit for detecting the difference between the two feedback signals.

6. A vibrating gyroscope according to claim 2, wherein the vibrating unit further includes a supporting member connected to the second electrode, the supporting member being located at a point corresponding to a node of the vibrating unit.

7. A vibrating gyroscope according to claim 6, wherein the supporting member is made of a conductive material and the driving signal is applied to the supporting member.

8. A vibrating gyroscope according to claim 4, wherein the driving circuit includes a cumulative circuit for receiving the two feedback signals and for deriving a summed signal representing the sum of the two feedback signals; and means for generating the driving signal from the summed signal.

9. A vibrating gyroscope according to claim 8, wherein the generating means includes an amplifier having an input coupled to the cumulative circuit and an amplification circuit having an input coupled to an output of the amplifier and an output coupled to the second electrode.

10. A vibrating gyroscope according to claim 9, further comprising a detection circuit for detecting the difference between the two feedback signals.

11. A vibrating gyroscope according to claim 10, wherein the detection circuit includes a differential amplification circuit having first and second inputs connected respectively to the two feedback signals, a synchronous detection circuit having a first input connected to an output of the differential amplification circuit and a second input connected to an output of the cumulative circuit, a smoothing circuit coupled to the output of the synchronous detection circuit, and an amplifying circuit coupled to the output of the smoothing circuit.

* * * * *